United States Patent Office 2,994,675
Patented Aug. 1, 1961

2,994,675
POLYAMINE STABILIZERS FOR POLYMERIZED ALPHA-OLEFINS
Robert N. Haward, Bowdon, and Thomas H. Boultbee, Sale, England, assignors to Shell Oil Company, a corporation of Delaware
No Drawing. Filed Oct. 26, 1956, Ser. No. 618,432
14 Claims. (Cl. 260—23)

This invention relates to novel compositions of polymers of alpha-olefins. The invention also relates to methods of stabilizing and lubricating polymers of alpha-olefins.

It is well known that polymers may be stabilized by the addition thereto of various stabilizing agents. However, in many instances it is required that more than one stabilizer be added depending upon the defects sought to be overcome. Thus, for example, where it is desired to stabilize a polymer against color deterioration, a single stabilizer may be added to the polymer for this purpose; if it is desired to improve the deterioration of the polymer from oxidation, still another stabilizer is added. In addition to stabilizers, molding compounds may have incorporated therein several other materials which are designed to serve specific functions. One of the most important additives in this class functions to lubricate the polymer to facilitate the molding process. This has been accomplished by the use of salts of higher fatty acids such as zinc stearate, cadmium stearate and the like. Such materials are highly effective for the purpose of lubrication, but they have the disadvantage of being toxic to human beings. As the lubricant is used in very small quantities, the toxicity consideration is not serious. This is not the case, however, where the polymer is a film-forming substance of the type used in the packaging of foods, cosmetics, pharmaceuticals and other materials which come in close human contact. Ideally, it is desirable to find a single compound, or at least as few as possible which perform as many of the essential functions as possible.

It is an object of this invention to provide novel compositions of polymers of alpha-olefins. It is yet another object of this invention to provide methods for stabilizing polymers of alpha-olefins from color deterioration and oxidation and at the same time provide a suitable mold lubricant. It is yet another object of this invention to provide novel molding compositions of lower alpha-olefins, particularly polyethylene, which contain a single compound which functions as a stabilizer and a mold lubricant. It is still another object of this invention to provide efficient methods for stabilizing and lubricating polymers of alpha-olefins. Other objects will become apparent as the description proceeds.

These and other objects are accomplished by a composition comprising a polymer of an alpha-olefin and a fatty acid salt of an aliphatic polyamine in which the fatty acid salt is derived from a carboxylic acid of more than 7 carbon atoms, said salt being present in an amount from 0.02 to 5% of the polymer. The salt of the polyamine serves three important functions: it stabilizes the color, it functions as an anti-oxidant for the polymer and lastly, it serves as a mold lubricant. Therefore, it is another embodiment of this invention to provide a method for stabilizing and lubricating polymers of alpha-olefins which comprises adding to a polymer of an alpha-olefin a fatty acid salt of an aliphatic polyamine in which the fatty acid has at least 7 carbon atoms.

The novel compositions and methods of this invention are directed to polymers of alpha-olefins. Such alpha-olefins include ethylene, propylene-1, butylene-1, pentene-1, decene-1, octadecene-1, and the like. In the preferred embodiment the compositions and methods are particularly effective for polymers of alpha-olefins derived from monomeric olefins having not more than 6 carbon atoms and applies still more particularly to polyethylene prepared using the method of Karl Ziegler. As applied to polyethylene of this type, it will be readily understood that this invention is particularly suited for stabilizing and lubricating polymers of very high molecular weight.

The fatty acid salt of the polyamine is derived from the reaction of an aliphatic polyamine and a long chain fatty acid. The fatty acids are characterized by several considerations. Thus, it is found that the fatty acids should be aliphatic and contain at least 7 carbon atoms. It is immaterial whether the fatty acid is saturated or unsaturated. Further, it is immaterial whether it is monocarboxylic or polycarboxylic, but it is preferred that the fatty acid be a monocarboxylic acid. Among the fatty acids which are suitable for this purpose may be mentioned decanoic acid, undecylenic acid, dodecylenic acid, myristic acid, palmitic acid, margaric acid, stearic acid, linoleic acid, oleic acid, linolenic acid, ricinolic acid, and the like.

The polyamine, which forms the other constituent of the fatty acid polyamine, may be selected from any aliphatic amine providing it contains two or more amine groups. The most preferred polyamine is hydrazine. Next in order of preference are the diamines such as ethylenediamine, 1,3-propanediamine and homologues thereof. Thereafter, triamines are preferred followed by tetramines, pentamines, and so on. In general it is preferred that the polyamine constituent be as simple as possible and contain up to four nitrogen atoms. Alternatively stated, it is preferred that the long chain fatty acid be selected from diamines, triamines and tetramines. Polyamines which are representative of those which are suitable for compositions and methods of this invention are the following: hydrazine, ethylenediamine, 1,2-butanediamine, diethylenetriamine, di(1-methylamylene)triamine, dieicosylenetriamine, triethylenetetramine, tri(1,2,2-trimethylethylene)tetramine, tetraethylenepentamine, tetraoctylenepentamine, hexapropyleneheptamine, and the like. The products obtained from the reaction of the polyamines and the caboxylic acids are well known in the art and are produced at temperatures ranging from 60° C. to 130° C.

The polymer of the alpha-olefin is blended with the polyamine salt in amounts ranging from 0.02% to 5% by weight. Preferably, however, it will be found that amounts ranging from .2% to 2.5% by weight of the polymer are sufficient for most applicants. In some instances, it may be desirable to add supplemental amounts of the conventional mold lubricants as cadmium or lead stearate, in which instance, the proportions by weight of the two types of salts may vary from 10:1 excess of one type to a 10:1 excess of the other type, and the total amount of both types of salts added is generally within the range just indicated. It will be found that equal proportions by weight of each type of salt gives highly beneficial results both as to stabilizing and lubricating properties of molding compounds containing polymers of alpha-olefins. As previously indicated, the compositions and methods of this invention are directed to polymers of alpha-olefins in general and more particularly to polymers of ethylene prepared by the method of Karl Ziegler, as described in Belgium Patent 533,362, which utilizes catalytic compositions such as aluminum trialkyl and titanium tetrachloride. Such polymers and the processes of making them are somewhat critical in their processing. For that reason it is preferred that the polyamine salts be added after the polymer is prepared. After the polyamine salt is added to the polymer, it is necessary that the mixture be blended in order to obtain a uniform composition.

The invention is more fully illustrated in Table I which shows results obtained in various tests for color stability. In these tests, a basic formulation of 100 parts of finely divided polyethylene powder, prepared by the method of Ziegler, and one part of the indicated stabilizer is used in half-pound batches. The dry powders are mixed in small pastry mixers for two minutes. After premixing, the formulation is gelled upon a 12" x 6" even speed two-roll mill with the mill surface temperatures at 150° C. After gelling is complete, the material is milled with a rolling bank until the total time for the start of the milling is 10 minutes. The milling hide is then cut off and divided into two parts. The first half of the milling hide is place in an 8" x 8" x .09" frame mold between polished stainless steel plates which are previously coated with stearic acid. The assembly is then heated in a hydraulic press and pressured at 10 cwt./sq. in. hydraulic pressure and 160 p.s.i. steam pressure for 5 minutes. The cold water is then turned on and the hydraulic pressure increased to 1 ton per square inch during cooling.

The second half of the mill hide is treated similarly but with the heating period increased to 20 minutes. In a few cases, a third portion of milled hide is cut and similarly treated for 1 hour.

Comparisons were made between the color of the two, or three, molded sheets and the change in shade is estimated by means of the Geometric Grey Scale identified as British Standard 1006. The results are shown in Table I.

*Table I*

| Formulation | Color Coding | | | | | |
|---|---|---|---|---|---|---|
| | 5 Min. Heat Mldg. | | 20 Min. Heat Mldg. | | 60 Min. Heat Mldg. | |
| | Color No. | Shade | Color No. | Shade | Color No. | Shade |
| Polyethylene Alone | 45 | Lt. Brown | 40 | Darker | 35 | Darker. |
| Polyethylene+0.5% Hydrazine Stearate | 47 | Cream | 42 | do | | |
| Polyethylene+1% Hydrazine Stearate | 50 | do | 45 | v. sl. Darkened | | |
| Polyethylene+0.5% Hydrazine Stearate and 0.5% Cadmium Stearate | 52 | do | 51 | Cream | 50 | Cream. |
| Polyethylene+1% Lead Stearate | 55 | do | 53 | do | | |
| Polyethylene+1% Zinc Stearate | 47 | do | | | 41 | Darker. |
| Polyethylene+1% Aluminum Stearate | 44 | Lt. Brown | 38 | Darker | 33 | Do. |
| Polypropylene Alone | 46 | Cream | 42 | Lt. Brown | 37 | Do. |
| Polypropylene+0.5% Hydrazine Ricinoleate | 48 | do | 43 | Darker | | |
| Polyethylene+1% Ethylene Diamine Stearate | 48 | do | 43 | do | 42 | Do. |

It will be noted that particularly fine results are obtained with the salts of hydrazine and a blend of hydrazine salts and metal salts of long chain fatty acids.

Table II shows the various test results on the antioxident effect on polyethylene prepared according to Belgian Patent 533,362. In these tests, solutions of polyethylene of various formulations were prepared in xylene to give a relative viscosity of 0.2 at room temperature. The solutions were stored at 140° C. in flasks fitted with air-condensers for varying periods of time. The relative viscosity was then determined at 124° C. and the results are shown in Table II where the amount of oxidation is shown by the amount of change in viscosity. It will be noted that the total change in viscosity with hydrazine stearate is nearly 25% less than with cadmium stearate.

*Table II*

| Storage Period (days) | Formulation | | |
|---|---|---|---|
| | Polyethylene Alone | Polyethylene+ 1% by wt. of Cadmium Stearate | Polyethylene+ 1% by wt. of Hydrazine Stearate |
| 0 | 1.43 | 1.40 | 1.42 |
| 1 | 1.29 | 1.29 | 1.41 |
| 4 | 1.20 | 1.18 | 1.35 |
| 7 | 1.16 | 1.16 | 1.25 |
| 10 | 1.07 | 1.12 | 1.20 |

We claim as our invention:

1. A normally solid polymeric composition comprising a polymer of a monoalpha-olefin of 2–3 carbon atoms and from about 0.02% to about 5% of a fatty acid salt of a monomeric aliphatic polyamine, said fatty acid being a carboxylic acid having more than 7 carbon atoms, the said polymer containing titanium and aluminum residues.

2. The composition of claim 1 in which the polymer is polyethylene.

3. The composition of claim 1 in which the polymer is polypropylene.

4. The composition of claim 1 in which the fatty acid salt of the polyamine is a hydrazine salt of a carboxylic acid having more than 7 carbon atoms.

5. The composition of claim 4 in which the fatty acid salt of the polyamine is hydrazine stearate.

6. A normally solid polymeric composition comprising polyethylene and from about 0.02% to about 5% of a fatty acid salt of hydrazine, said fatty acid being a carboxylic acid having more than 7 carbon atoms, the said polymer containing titanium and aluminum residues.

7. The composition of claim 6 in which the fatty acid is stearic acid.

8. The method for stabilizing normally solid polymers of aliphatic monoalpha-olefins of 2–3 carbon atoms which comprises blending with said polymer from about 0.02% to about 5% by weight of a fatty acid salt of a monomeric aliphatic polyamine, said fatty acid being a carboxylic acid having more than 7 carbon atoms, the said polymer containing titanium and aluminum residues.

9. The method of claim 8 in which the polymer is polyethylene.

10. The method of claim 8 in which the polymer is polypropylene.

11. The method of claim 8 in which the fatty acid salt of the polyamine is a hydrazine salt.

12. The method of claim 8 in which the fatty acid salt of the polyamine is hydrazine stearate.

13. The method for stabilizing normally solid crystalline polyethylene comprising blending with said polyethylene from about 0.02% to about 5% of a fatty acid salt of hydrazine, said fatty acid being a carboxylic acid having more than 7 carbon atoms, the said polymer containing titanium and aluminum residues.

14. The method of claim 13 in which the fatty acid is stearic acid.

References Cited in the file of this patent

UNITED STATES PATENTS

| | | |
|---|---|---|
| 2,313,144 | Gomm | Mar. 9, 1943 |
| 2,341,186 | Matheson et al. | Feb. 8, 1944 |
| 2,462,331 | Myers | Feb. 22, 1949 |
| 2,496,907 | Dawson | Feb. 7, 1950 |
| 2,544,772 | Audreith et al. | Mar. 13, 1951 |
| 2,765,293 | Happoldt | Oct. 2, 1956 |
| 2,772,179 | Kanlinowski et al. | Nov. 27, 1956 |
| 2,810,708 | Kubico et al. | Oct. 22, 1957 |
| 2,843,577 | Friedlander | July 15, 1958 |

OTHER REFERENCES

Ralston: Fatty Acids and Their Derivatives, pages 673–684 and 708, John Wiley (1948).

Lally et al.: Stabilization of Polyvinyl Chloride, pages 111–112, 114, 116, Modern Plastics, vol. 27, No. 4 (December 1949).